United States Patent
Aubauer et al.

(10) Patent No.: US 7,058,430 B2
(45) Date of Patent: Jun. 6, 2006

(54) MOBILE COMMUNICATIONS TERMINAL WITH A HANDS-FREE MODE

(75) Inventors: Roland Aubauer, Bocholt (DE); Stefano Ambrosius Klinke, Kerpen (DE); Christoph Poerschmann, Gladbeck (DE); Michael Hulskemper, Hunxe (DE); Frank Lorenz, Bocholt (DE)

(73) Assignee: Siemens Aktiengesellschaft, Munich (DE)

( * ) Notice: Subject to any disclaimer, the term of this patent is extended or adjusted under 35 U.S.C. 154(b) by 425 days.

(21) Appl. No.: 10/410,430

(22) Filed: Apr. 9, 2003

(65) Prior Publication Data

US 2004/0043796 A1    Mar. 4, 2004

(30) Foreign Application Priority Data

Sep. 4, 2002    (EP) .................................. 02007940

(51) Int. Cl.
  *H04M 1/00* (2006.01)
  *H04B 1/08* (2006.01)
  *H04R 29/00* (2006.01)

(52) U.S. Cl. .............. 455/569.1; 455/350; 379/420.02; 379/433.02; 381/59

(58) Field of Classification Search ............ 455/569.1, 455/569.2, 221, 339, 334, 350; 379/433.02, 379/420.01, 420.02; 381/59, 98–103, 89, 381/150, 337

See application file for complete search history.

(56) References Cited

U.S. PATENT DOCUMENTS

| | | | | |
|---|---|---|---|---|
| 4,648,110 A | * | 3/1987 | Elsasser | 379/388.05 |
| 5,884,156 A | * | 3/1999 | Gordon | 455/321 |
| 6,144,738 A | | 11/2000 | Hawker et al. | |
| 6,148,080 A | * | 11/2000 | Collin | 379/433.02 |
| 6,201,873 B1 | * | 3/2001 | Dal Farra | 381/100 |
| 6,263,079 B1 | * | 7/2001 | Nordstrom | 379/433.13 |
| 6,324,284 B1 | * | 11/2001 | Hawker et al. | 379/433.02 |
| 6,819,946 B1 | * | 11/2004 | Hansson | 455/569.1 |
| 6,907,121 B1 | * | 6/2005 | Andersson | 379/433.02 |
| 2003/0069000 A1 | * | 4/2003 | Kindo et al. | 455/345 |

FOREIGN PATENT DOCUMENTS

| | | |
|---|---|---|
| EP | 0 903 909 | 3/1999 |
| EP | 0 942 570 | 9/1999 |

* cited by examiner

Primary Examiner—Duc M. Nguyen
(74) Attorney, Agent, or Firm—Bell, Boyd & Lloyd LLC

(57) ABSTRACT

A mobile communications terminal is provided having a first loudspeaker for emitting sound signals in a normal mode of the communications terminal, a second loudspeaker for emitting sound signals in a hands-free mode of the communications terminal, an antenna and a signal processing device for processing signals which have been received by the antenna and for supplying processed signals to the first loudspeaker and to the second loudspeaker depending on whether the communications terminal is in the normal mode or in the hands-free mode, wherein better high-frequency reproduction in a hands-free mode is achieved in that, in the hands-free mode, the signal processing device is designed to supply processed signals at a frequency of more than 1 kHz to the first loudspeaker and the first loudspeaker is designed to reproduce sound signals at a frequency of more than 1 kHz.

5 Claims, 1 Drawing Sheet

MOBILE COMMUNICATIONS TERMINAL WITH A HANDS-FREE MODE

BACKGROUND OF THE INVENTION

The present invention relates to a mobile communications terminal having a first loudspeaker for emitting sound signals in a normal mode of the communications terminal, a second loudspeaker for emitting sound signals in a hands-free mode of the communications terminal, an antenna and a signal processing device for processing signals which have been received by the antenna and for supplying processed signals to the first loudspeaker and to the second loudspeaker depending on whether the communications terminal is in the normal mode or in the hands-free mode, and further relates to a method for emitting sound signals from the communications terminal.

Mobile communications terminals of the abovementioned type can be used both in a normal mode, in which the communications terminal is held against a user's head, and for a hands-free mode, in which the user's head is arranged at a distance from the communications terminal. The first loudspeaker for a normal mode cannot, in principle, be used for a hands-free mode since it cannot produce the sound pressure levels which are required for a hands-free mode.

For this reason, an integrated second loudspeaker is provided for a hands-free mode, which in many cases is arranged on the opposite side of the communications terminal to the first loudspeaker, where sufficient space is available to accommodate the comparatively large second loudspeaker. The sound is normally emitted from the second loudspeaker either directly through outlet openings in the rear face of the communications terminal, in which case it is assumed that the first loudspeaker as well as a keypad and a display for the communications terminal are located on its front face.

Alternatively, it is also possible to pass the sound signals from the second loudspeaker, which is located within the housing of the communications terminal, via channels to openings in the housing surface.

The second loudspeaker, which, in the case of mobile communications terminals, is arranged on their rear face owing to the large amount of space required by hands-free loudspeakers, thus does not emit its sound energy in the direction of a user of a communications terminal. This leads to a dull hearing impression with low high-frequency levels, which can have a negative influence on the comprehensibility of speech. Because of this, the tonal quality difference between the hands-free mode and the normal mode in the case of present-day communications terminals is very great, and will increase further in future communications terminals which will have a wider speech signal bandwidth.

Against this background, the present invention is directed toward improving speech quality in the hands-free mode of mobile communications terminals, particularly those in which the hands-free loudspeaker is arranged on the rear face of the appliance, and also toward specifying a method for emitting sound signals from such a communications terminal.

SUMMARY OF THE INVENTION

Such object is achieved for the communications terminal mentioned initially in that, in the hands-free mode, the signal processing device is designed to supply processed signals at a frequency of more than 500 Hz to the first loudspeaker and the first loudspeaker is designed to reproduce sound signals at a frequency of more than 500 Hz.

The present invention is based on the fundamental idea that the loudspeaker which is provided for the normal mode in the mobile communications terminal is used for reproducing the high-frequency range of a sound signal which is to be emitted in the hands-free mode. This is based on the fact that the high-frequency sound signal components of speech, for example, actually contain relatively little energy, so that the loudspeaker for the normal mode also can be used for a hands-free mode in this frequency range. In particular, the sound pressure level which is required for the hands-free mode can be reproduced in the high-frequency range of the audio spectrum above 500 Hz.

The advantages of the present invention are particularly evident when the first loudspeaker is arranged on the front face of the communications terminal, and the second loudspeaker is arranged on the rear face of the communications terminal. If the second loudspeaker for the hands-free mode is designed as an integrated loudspeaker, that is to say it is integrated in the rear face of the communications terminal, the tonal quality difference between the normal mode and the hands-free mode is particularly evident. This is because only a small fraction of the high-frequency components of the sound signal reaches the ear of a user of the communications terminal since the high-frequency components of the sound signal are emitted directionally through openings or channels in the rear face of the appliance, so that the intensity of these high-frequency components is reduced more than proportionally.

The second loudspeaker for the hands-free mode can emit the entire spectrum of the received sound signals. However, it is preferable in the hands-free mode for the signal processing device to be designed to supply processed signals at a frequency of less than 500 Hz to the second loudspeaker. This is because this results in two-channel sound reproduction, with the low-frequency signal component being reproduced via the second loudspeaker, and the high-frequency signal component being reproduced via the first loudspeaker. The cut-off point between the low-frequency signal component which is emitted via the second loudspeaker and the high-frequency signal component which is emitted via the first loudspeaker is preferably 1 kHz. It is also possible for the first loudspeaker to be designed to reproduce sound signals at a frequency of >1 kHz, while the second loudspeaker reproduces the entire acoustic signal that is to be emitted.

In the hands-free mode, the signal processing device is preferably designed to match the intensities of the sound signals which are emitted from the first loudspeaker and from the second loudspeaker to a natural spectral intensity profile, as a function of the relative arrangement of the first loudspeaker and of the second loudspeaker with respect to one another. As such, for example, the first loudspeaker for the normal mode, which is also used in the hands-free mode, is driven to such an extent that its emitted sound intensity is matched to the sound intensity in the low-frequency range.

In the case of two-channel sound reproduction, both the first loudspeaker and the second loudspeaker each may have their own amplifiers. The signal processing may be used to preprocess separate processed signals for the first loudspeaker and for the second loudspeaker, and supply them to the associated separate amplifiers.

With regard to the method of the present invention, the object mentioned above is achieved by a method for emitting sound signals from a mobile communications terminal, with the sound signals being emitted via a first loudspeaker for a normal mode of the communications terminal, and being emitted via a second loudspeaker for a hands-free mode of the communications terminal, with the frequency range above 1 kHz being supplied to the first loudspeaker in the hands-free mode.

Additional features and advantages of the present invention are described in, and will be apparent from, the following Detailed Description of the Invention and the Figures.

DETAILED DESCRIPTION OF THE INVENTION

Figure 1:
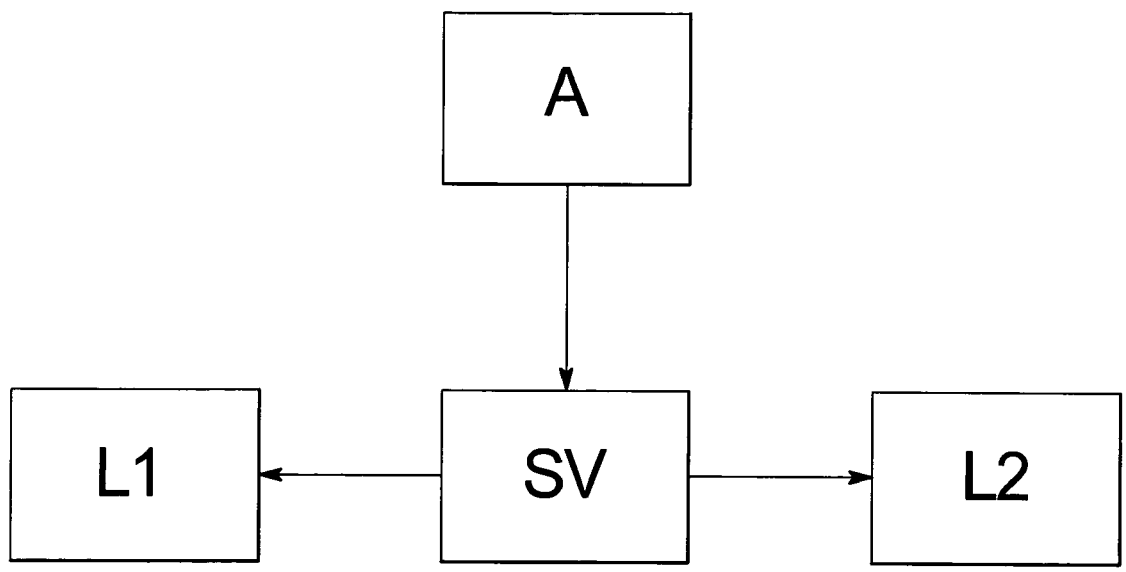
FIG. 1 shows a block diagram of the components of a mobile communications terminal of the present invention which are associated with sound reproduction.

Signals received by an antenna A are supplied to a signal processing unit SV, which processes the received signals and supplies them to two loudspeakers L1, L2.

The first loudspeaker L1 is used in a normal mode of a mobile communications terminal and is arranged on its front face. During this normal mode, the entire frequency spectrum of the received signals is emitted via the loudspeaker L1.

The loudspeaker L2, which is integrated in the rear face of the communications terminal, is intended for a hands-free mode. Sound is emitted via openings in the housing rear face of the communications terminal. In the hands-free mode, the signal processing device SV divides the received signals into a high-frequency component above 1 kHz and into a low-frequency component below 1 kHz, with the high-frequency component being supplied to the first loudspeaker L1, and the low-frequency component being supplied to the second loudspeaker L2.

A separate amplifier is provided for each loudspeaker. Each of the amplifiers is controlled so as to produce a natural intensity profile of the sound signals for the ear of a user as the overall sound emission from the communications terminal.

This results in an acoustic two-channel system in a mobile communications terminal. In this case, the tonal quality is considerably better than that of known communications terminals, since the high frequencies can be reproduced in a satisfactory manner in the hands-free mode.

Although the present invention has been described with reference to specific embodiments, those of skill in the art will recognize that changes may be made thereto without departing from the spirit and scope of the present invention as set forth in the hereafter appended claims.

The invention claimed is:

1. A mobile communications terminal, comprising:
   a first loudspeaker for emitting sound signals in a normal mode of the communications terminal;
   a second loudspeaker for emitting sound signals in a hands-free mode of the communications terminal;
   an antenna; and
   a signal processing device for processing signals which have been received by the antenna and for supplying processed signals to the first and second loudspeakers depending on whether the communications terminal is in the normal or hands-free mode, wherein, in the hands-free mode, the signal processing device matches intensities of the sound signals which are emitted from the first and second loudspeakers to a natural spectral intensity profile, as a function of the relative arrangement of the first and second loudspeakers with respect to one another.

2. A mobile communications terminal as claimed in claim 1, wherein the first loudspeaker is arranged on the front face of the communications terminal, and the second loudspeaker is arranged on the rear face of the communications terminal.

3. A mobile communications terminal as claimed in claim 1, wherein, in the hands-free mode, the signal processing device supplies processed signals at a frequency of less than 500 Hz to the second loudspeaker.

4. A method for emitting sound signals from a mobile communications terminal, the method comprising the steps of:
   emitting the sound signals via a first loudspeaker for a normal mode of the communications terminal;
   emitting the sound signals via a second loudspeaker for a hands-free mode of the communications terminal, wherein, in the hands-free mode, signals in a frequency range above 1 kHz is supplied to the first loudspeaker for emission, and
   matching intensities, in the hands-free mode and via a signal processing device, of the sound signals which are emitted from the first and second loudspeakers to a natural spectral intensity profile as a function of a relative arrangement of the first and second loudspeakers with respect to one another.

5. A method for emitting sound signals from a mobile communications terminal as claimed in claim 4, wherein, in the hands-free mode, the signals in the frequency range above 1 kHz are supplied exclusively to the first loudspeaker, and signals in a frequency range below 1 kHz is supplied exclusively to the second loudspeaker.

* * * * *